Oct. 31, 1944.   J. E. WAINWRIGHT   2,361,888
GAUGE FOR SPLINED PARTS, GEAR MEMBERS AND THE LIKE
Filed Nov. 12, 1941         3 Sheets-Sheet 1

Oct. 31, 1944.  J. E. WAINWRIGHT  2,361,888
GAUGE FOR SPLINED PARTS, GEAR MEMBERS AND THE LIKE
Filed Nov. 12, 1941  3 Sheets-Sheet 2

Inventor:
John E. Wainwright
by Babcock & Babcock
Attorneys.

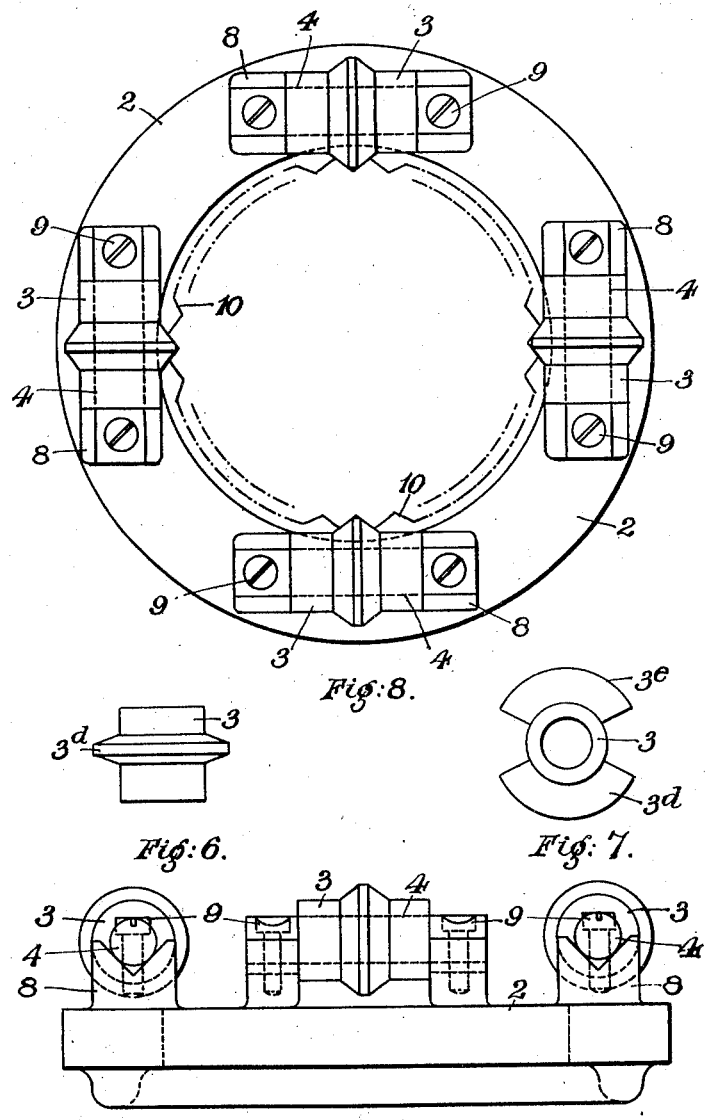

Patented Oct. 31, 1944

2,361,888

UNITED STATES PATENT OFFICE 2,361,888

GAUGE FOR SPLINED PARTS, GEAR MEMBERS, AND THE LIKE

John Ernest Wainwright, Hunningham, England, assignor to Coventry Gauge & Tool Company Limited, Fletchamstead, Coventry, Warwickshire, England Application November 12, 1941, Serial No. 418,812
In Great Britain January 18, 1941

3 Claims. (Cl. 33—174)

This invention relates to certain improvements in gauges for use in gauging the component diameters of splined parts, gear members and the like male and female products, and has for its object to facilitate the gauging operation and to distribute the wear on the gauging elements thereby prolonging the useful life of the gauge and avoiding the present necessity for frequent adjustment.

The improved gauges are of the caliper type and characterized in that the gauging elements consist of freely rotatable rollers adapted for rolling engagement with the work-piece along a line parallel with the splines, serrations or teeth and having profiles which will vary in shape and dimensions according to the nature of the work to be gauged.

The positions of the rollers in the gauge may be fixed but are preferably adjustable for setting purposes and also, if desired, for the purpose of gauging work of different nominal diameters.

In the accompanying drawings,

Figures 6 and 7 are detail views in elevation and plan respectively of a modified form of roller.

Figures 8 and 9 are plan and side views respectively of a further modified form of the improved gauge.

Figure 1:
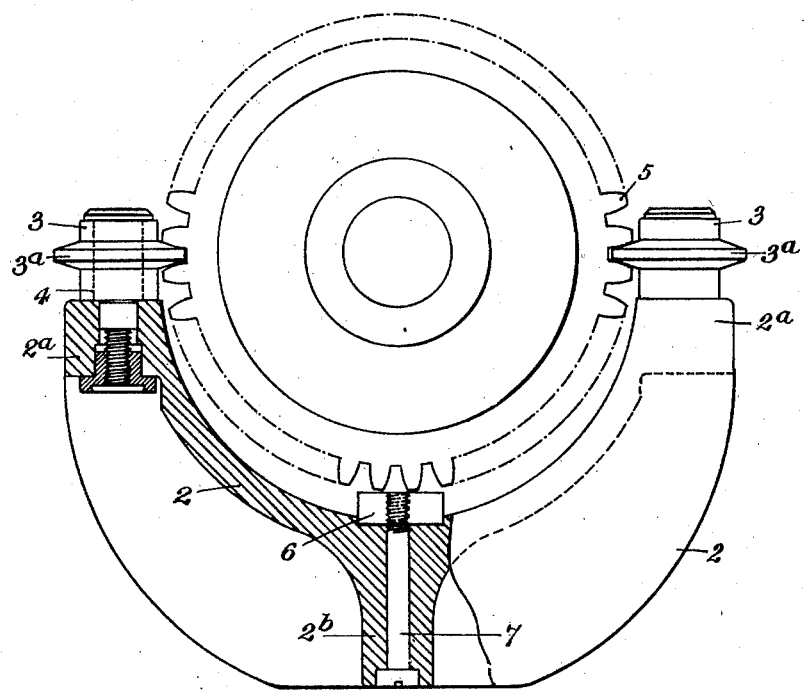
Figure 1 is a view partly in section of a gauge embodying the present invention.
Figure 2:
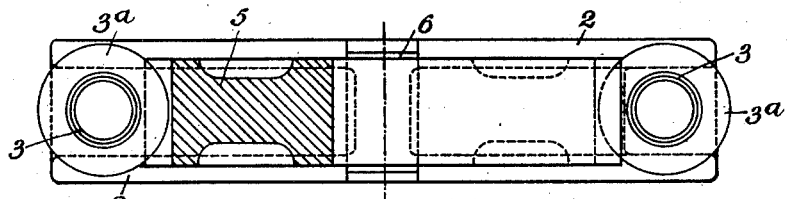
Figure 2 is a plan view thereof also partly in section.

Referring to the construction shown in Figures 1 and 2 the body 2 of the improved gauge is of U-shape and for purposes of rigidity is made, as shown, of an inverted channel section, the free ends 2ª of the limbs and the centre portion 2ᵇ being left solid.

The gauging elements 3 consist of rollers which are freely rotatable about parallel axes on pins 4 adjustably mounted in the solid ends 2ª of the limbs of the body. In the example shown each roller is formed with an annular rib 3ª, the cross-sectional shape of which is formed to gauge the effective or pitch diameter of a gear wheel 5.

Between the rollers a locating guide is arranged which, as shown, consists of a pad 6 seated in a recess in the bottom of the body 2 and fixed or adjustable in the central plane of the gauge by means of a screw 7 mounted in the solid centre portion 2ᵇ of the gauge body.

Figure 3:
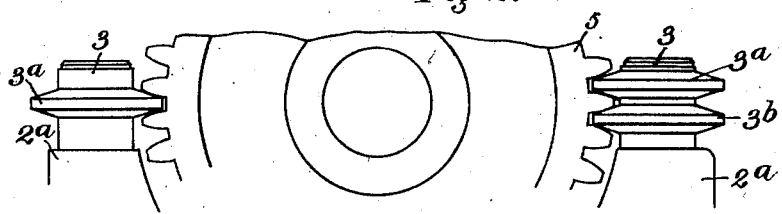
Figure 3 is a fragmentary view of a gauge illustrating a slight modification.

The gauge is applied to the work, or vice versa, in a direction parallel with the teeth on the latter with the rollers making a rolling engagement therewith. The position of the gauge is determined by the pad 6 which is adjusted so that the gauge can only be applied to the work-piece when the latter is contacting the pad. In the case of a gear wheel having an even number of teeth each roller need be formed with one rib only, but in the case where the number of teeth are uneven one of the rollers, as shown in Figure 3 is formed with two ribs 3ª, 3ᵇ.

Figure 5:
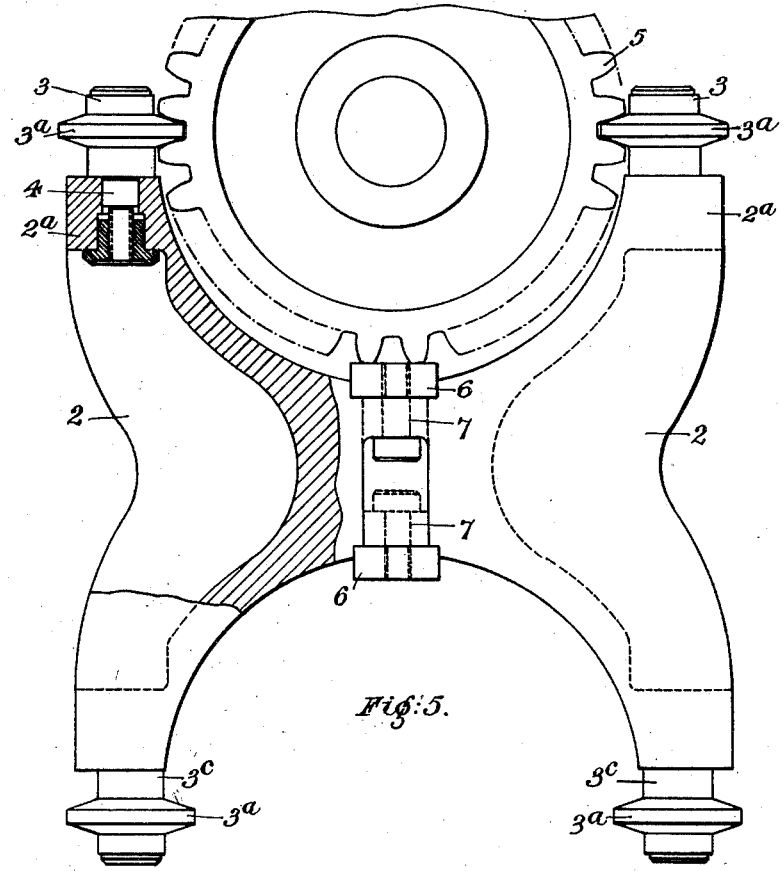
Figure 5 illustrates the application of the invention to a double-ended caliper gauge of the "go" and "not go" type.

The invention is equally applicable to double ended limit gauges. For example, as shown in Figure 5, the gauge body 2 is shaped to carry two pairs of rollers, one pair 3, 3 acting as the "go" and the other pair 3ᶜ, 3ᶜ as the "not go" gauge, a pre-adjusted locating pad 6 being provided in each case.

Figure 4:
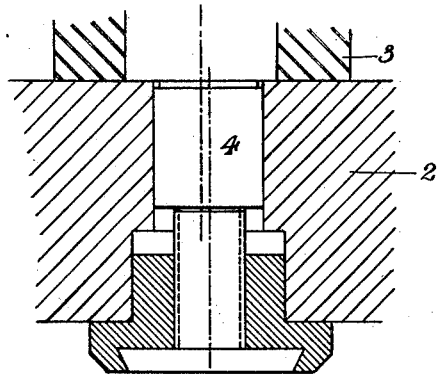
Figure 4 is a detail view on a larger scale illustrating one way of providing for adjustment of the rotatable gauging elements.

Alternatively, the rollers 3, as shown in Figures 6 and 7, may be formed with circumferentially discontinuous gauging surfaces of different diameters, one part 3ᵈ functioning as the "go" and the other part 3ᵉ as the "not go" gauge. In this case the gauge would function as a limit gauge with only one pair of rollers.

Where a more comprehensive check is required than can be obtained by a single pair of rollers, several rollers may be employed for simultaneous engagement with the work-piece. For example, as shown in Figures 8 and 9 a number of gauging rollers 3 may be arranged tangentially around a gauge body 2 of annular form, the said rollers being freely rotatable on pins 4 which are secured in V-lugs 8 on the body by means of screws 9.

Where the improved gauges are of the adjustable type each pin 4 carrying a roller 3 may be mounted in the gauge body 2, about an axis eccentric to the axis of the roller, as shown in Figure 4. Alternatively, the pins carrying the rollers may be arranged for movement in the gauge body by means of screws or otherwise in the direction of the required adjustment.

The shape of the profile of the rollers will, of course, vary with the nature of the work to be gauged and may be such as to check the pitch diameter of gear wheels, the core and major diameters of a splined shaft or, as represented in Figure 8, the shape and spacing of serrations, such as are indicated at 10.

The improved gauges may also be employed for gauging internal splines, serrations or teeth in which case the gauge body would be provided with a suitable handle and with guides to facilitate engagement with and disengagement from the work-pieces.

I claim:

1. A gauge for measuring toothed, splined, and serrated work-pieces of which the teeth, splines or serrations are parallel with the axis of the work-piece, said gauge comprising a body, pins mounted therein about parallel axes extending parallel to the plane of said body and disposed at opposite sides of said body, a roller freely rotatable on each pin and adapted to engage said work-piece with a rolling contact in a direction parallel with and between said teeth, splines or serrations, said body being provided with locating guide means disposed equi-distantly between said rollers and offset from a plane extending perpendicularly to and intersecting the axes of said rollers a distance equal to the radius of the work-piece being measured for locating said gauge with respect to said work-piece.

2. A gauge for measuring toothed, splined, and serrated work-pieces of which the teeth, splines or serrations are parallel with the axis of the work-piece, said gauge comprising a body of U-shape, a pin adjustably mounted in the free end of each limb thereof parallel with each other and with the plane of said body, a gauging roller freely rotatable on each pin and adapted to engage the work-piece with a rolling contact in a direction parallel with and between the teeth, splines or serrations, said body being provided with locating guide means disposed equi-distantly between said rollers and offset from a plane extending perpendicularly to and intersecting the axes of said rollers a distance equal to the radius of the work-piece being measured for locating the rollers with respect to the work-piece.

3. A gauge for measuring toothed, splined and serrated work-pieces according to claim 1 in which the locating guide means is adjustable with respect to the body of the gauge.

JOHN ERNEST WAINWRIGHT.